United States Patent [19]
Wing

[11] 3,857,556
[45] Dec. 31, 1974

[54] VEHICLE SUSPENSIONS
[75] Inventor: Bernard Ridge Wing, Leicester, England
[73] Assignee: Dunlop Limited, London, England
[22] Filed: Feb. 21, 1973
[21] Appl. No.: 334,201

[30] Foreign Application Priority Data
Feb. 26, 1972  Great Britain..................... 8964/72

[52] U.S. Cl............. 267/63 A, 267/152, 188/264 G
[51] Int. Cl............................................. B60g 11/24
[58] Field of Search. 280/124 R; 188/264 G, 264 R; 267/63 R, 63 A, 152, 153

[56] References Cited
UNITED STATES PATENTS
2,801,714  8/1957  Dotto............................. 188/264 G
2,802,662  8/1957  Hirst............................... 267/63 A
3,519,260  7/1970  Irwin............................... 267/152
3,684,271  8/1972  Arthur............................. 267/152
3,750,854  8/1973  Gramley........................ 188/264 R FOREIGN PATENTS OR APPLICATIONS
1,232,539  5/1971  Great Britain................. 188/264 G Primary Examiner—Philip Goodman
Attorney, Agent, or Firm—Stevens, Davis, Miller & Mosher

[57] ABSTRACT

A vehicle suspension comprising an elastomeric material spring for attachment between the vehicle and a wheel bearing housing and a means for limiting heat transfer between the housing and the spring. The means maybe a low conductivity member either separate or integral with the end plate of the spring, of which the following is a specification.

7 Claims, 4 Drawing Figures 3,857,556

VEHICLE SUSPENSIONS

This invention relates to vehicle suspensions and in particular to suspensions which utilize elastomeric material springs such as are used in railway vehicles.

The fatigue life of springs of elastomeric material is shortened if the material is subjected to high temperature and, for materials having properties useful as springs, temperatures above 65° C. are sufficiently high to cause deterioration. Ambient temperatures of up to 40° C. may be encountered in service and thus only 25° C. temperature rise in the spring is permissible caused by heat transmitted from other sources such as, for example, the axle box of the vehicle. Heat is created in the bearings of the axle box and is transmitted from the brakes through the wheel shaft and bearings to the axle box and this heat is conducted to the springs which are connected to the axle box. Previously spring failure has been attributed to spring material faults but it is now considered that such failure may be due to the temperatures reached in the spring.

According to one aspect of the present invention a vehicle suspension comprises a spring of elastomeric material arranged for attachment at one end to a vehicle, a housing for a vehicle wheel bearing connected to the other end of the said spring and means for limiting the rate of heat transfer between the housing and the elastomeric material spring.

The means for limiting the rate of heat transfer may comprise a low conductivity member located between the axle box and the spring and this low conductivity member may be an end plate for the elastomeric material spring or alternatively the means may comprise an air space which acts as heat insulation between the axle box and the spring. This air space can be formed by providing the spring with load-carrying points or alternatively by providing the axle box with load-carrying ridges or points. These ridges or points carry the necessary loads while at the same time, by reducing the contact area between the spring and the axle box, introduce a heat barrier in the form of an air space.

Heat-dissipating means may also be provided at the end plate of the spring to increase the rate of loss of heat and further reduce the heat available to be conducted into the elastomeric material of the spring. The heat-dissipating means may comprise fins or cooling apertures in an end plate of a spring.

The invention may be applied to any of the usual forms of elastomeric spring, for example, a flat rubber spring with or without interleaving plates and a chevron-type rubber spring again with or without interleaving plates.

Other features of the invention will become apparent from the following description. by way of example only, of some embodiments of the invention in conjunction with the diagrammatic drawings in which.

Figure 1:
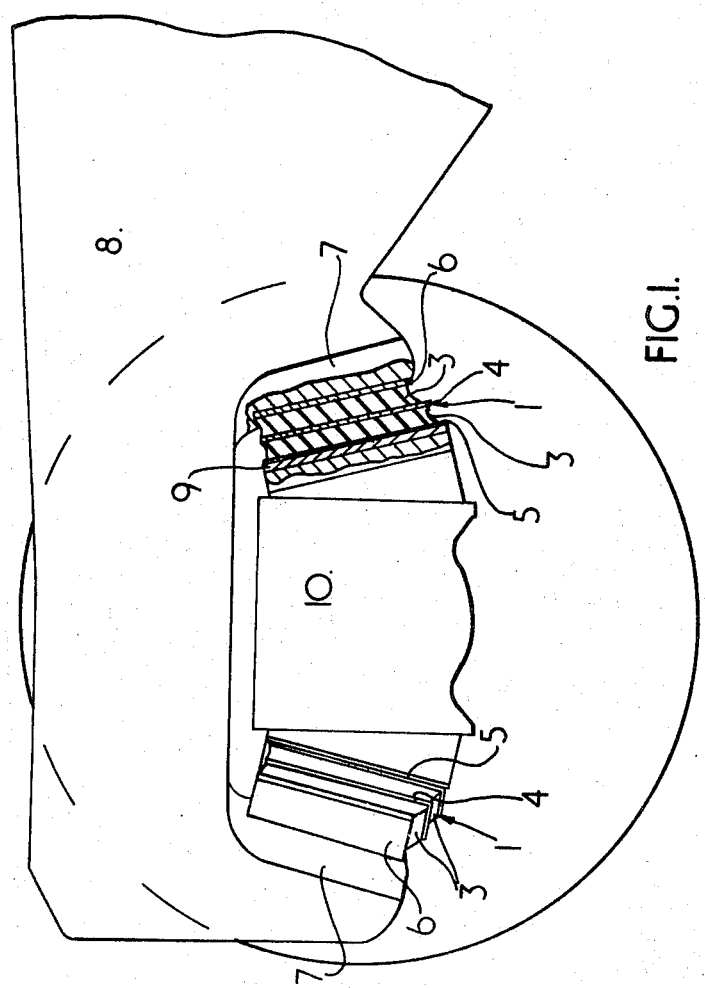
FIG. 1 is a part-sectioned side view of a railway vehicle primary suspension.
Figure 2:
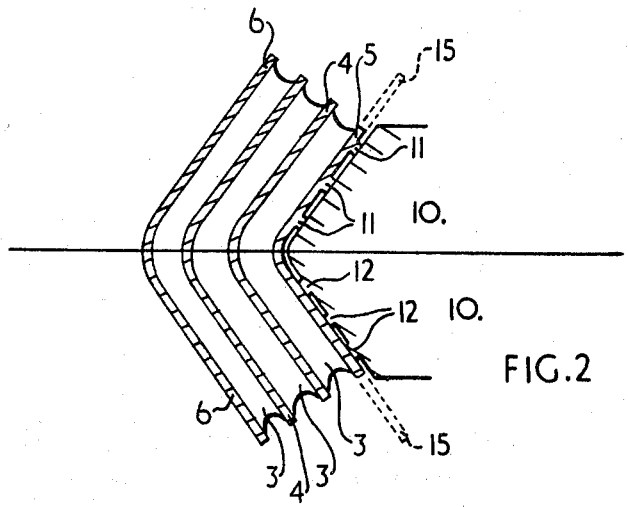
FIG. 2 is a cross-section of a spring as in FIG. 1 showing two alternative forms of heat-transfer limiting means.

The vehicle suspension shown in FIGS. 1 and 2 comprises two chevron-type elastomeric springs 1 each comprising a series of rubber blocks 3, V-shaped interleaving plates 4 and V-shaped end plates 5 and 6. The springs 1 are attached by the end plates 6 to abutments 7 formed in a side frame 8 of the vehicle. The other end plates 5 of the springs abut a V-shaped plate 9 of material such as asbestos, cork, mica and similar low thermal-conductivity barriers. Such barriers may be formed by fabricated laminates of high density compounds of such materials, or may be formed from materials that can be used in their natural form. The plate 9 in turn abuts an axle box 10 of the vehicle in which is supported a wheel and axle set.

In operation of the vehicle, heat generated in the axle box and heat transferred to the axle box from the brakes is passed to the springs 1 by conduction. The low thermal conductivity material of the plates 9 restricts the rate of heat flow and thus restricts the degree of heating of the rubber material of the springs.

The low conductivity material may be used as the end plate 5 of the elastomeric spring to avoid the need for two separate components. In this case the material chosen requires to have the necessary physical characteristics to withstand the mechanical loads. Materials such as resinimpregnated asbestos and resin-impregnated fabric are suitable and are readily bonded to the elastomeric materials having well known bonding techniques.

An alternative or supplementary means of limiting the rate of heat flow is shown in the upper half of FIG. 2 illustrating the reduction in the area of contact between the end plate 5 and the axle box 10. The reduction in area is obtained by forming projections 11 on the end plate which abuts the axle box. The lower half of FIG. 2 shows a similar arrangement in which projections 12 are provided on the abutment face of the axle box 10.

Figure 3:
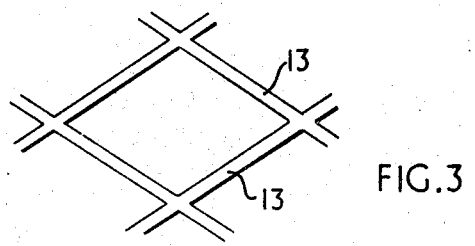
FIGS. 3 and 4 show in plan two arrangements of projections for the limiting means.
Figure 4:
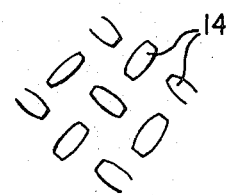

A convenient means of providing the projections is to place an additional plate member between the end plate 5 and the axle box 10 which additional plate has provided the required projections. Plates having projecting ridges 13 (see FIG. 3) or projecting means 14 (see FIG. 4) are already produced for use as industrial floor surfacing plates and in the case of chevron springs a V-shaped member of such material is conveniently placed between the end plate 5 of each spring and the axle box 10 as described for the low conductivity plate embodiment.

The use of a thermal barrier, formed by a low conductivity material or a reduced contact area having air spaces, reduces the rate of heat flow to the end plate of the spring and thus, as heat is lost by radiation and conduction to the surrounding air the end plate member 5 reaches a lower temperature than it would otherwise. Thus the first rubber block 3 of the spring is maintained at a lower temperature. The temperature of the rubber may be further restricted by increasing the rate of heat loss from the end plate 5 and if necessary the interleavingg plates. This may be achieved by extending the end spring plate adjacent to the axle box to form cooling fins 15 as shown by dotted lines in FIg. 2. This will encourage heat dissipation by the action of air from the slipstream of the vehicle, passing through the air spaces formed between the axle box and the spring.

The invention is applicable to flat plate springs and chevron springs positioned with the axle box at the apex or base of the V-section.

Having now described my invention, what I claim is:

1. A vehicle suspension comprising a spring of elastomeric material having means at one end for attachment to a vehicle, an end plate at the other end connected to a vehicle wheel bearing, means for limiting the rate of heat transfer between the bearing and the elastomeric material comprising a series of projections between the end plate and the bearing to form a space for the air to pass therethrough.

2. The vehicle suspension of claim 1 in which the projections are independent and not interconnected with each other to define a plurality of air passages between the plate and the bearing.

3. A vehicle suspension according to claim 1 wherein the end plate is bonded to the elastomeric material of the spring.

4. A vehicle suspension according to claim 1 wherein the projections are formed in the end plate of the spring.

5. A vehicle suspension according to claim 1 wherein the end plate includes heat-dissipating means.

6. A vehicle suspension according to claim 5 wherein the heat-dissipating means comprises cooling fins.

7. A vehicle suspension according to claim 5 wherein the heat-dissipating means comprises cooling apertures in the end plate.

* * * * *